May 28, 1940.  I. JUHÁSZ  2,202,453
MEANS FOR DETERMINING THE SHOOTING ELEMENTS OF MOVING TARGETS
Filed Dec. 13, 1937  2 Sheets-Sheet 1

I. Juhász
INVENTOR

May 28, 1940.   I. JUHÁSZ   2,202,453
MEANS FOR DETERMINING THE SHOOTING ELEMENTS OF MOVING TARGETS
Filed Dec. 13, 1937   2 Sheets-Sheet 2
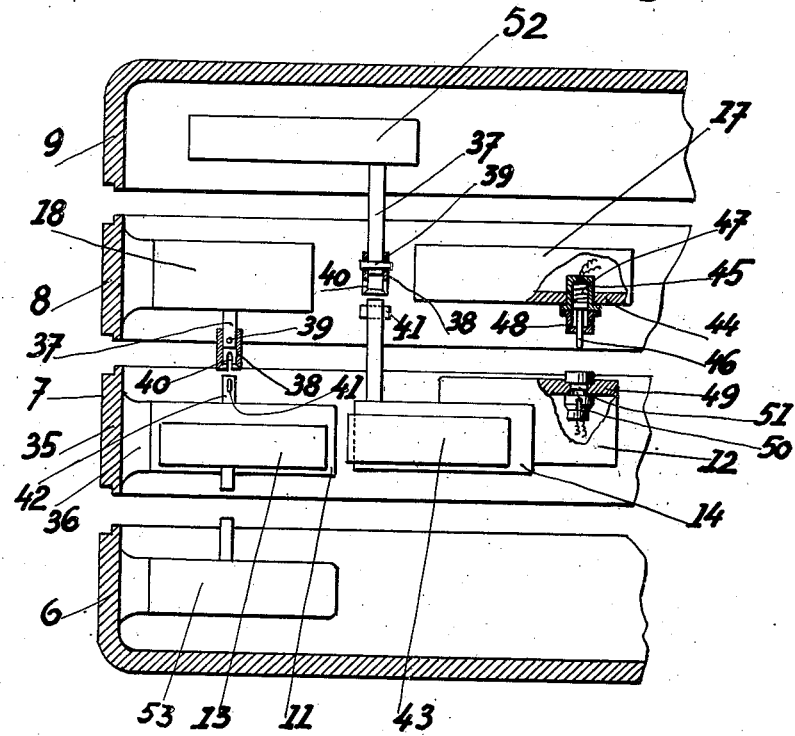

Patented May 28, 1940

2,202,453

UNITED STATES PATENT OFFICE 2,202,453

MEANS FOR DETERMINING THE SHOOTING ELEMENTS OF MOVING TARGETS

István Juhász, Budapest, Hungary

Application December 13, 1937, Serial No. 179,623
In Hungary December 30, 1936

3 Claims. (Cl. 73—151)

This invention relates to means for ascertaining the shooting elements of moving targets, more particularly of flying targets, by which the shooting elements, which are continually changing owing to the movement of the target, are indicated at short intervals, for instance six times a minute. Such appliances consist in general of a series of measuring instruments or instrument units co-operating with one another, each of which serves for determining one of the quantities necessary for ascertaining the position of the target. In these known appliances one measuring instrument serves for instance to ascertain the angle of elevation and the lateral angle of the target. Another instrument fitted into the appliance is the so-called distance carriage, which moves relatively to a fixed point in the appliance in such a way that its distance from the fixed point is at all times proportional to the distance of the target. This distance carriage carries those devices which determine the direction of flight of the target and the geometrical position of the point of aiming. Other instruments in the appliance ascertain the lateral deviation and the angle of lead. Others again determine the magnitude of the effects of the day, such as the prevailing wind, the temperature, the alteration in the initial velocity of the shot, and like factors, for which corresponding corrections must be effected in the shooting elements. A further instrument fitted into the appliance is the multiplier, which ascertains the position of the target at the moment of explosion of the shot by multiplying the speed of the target by the time of flight of the shot. A separate group of instruments ascertains the ballistic values, and another group of instruments ascertains the height of the target and the distance of the target, and in addition there are instruments which convert the shooting elements to allow for the location of the battery, when the appliance for ascertaining the shooting elements and the battery are not at the same place, but at different places, and therefore allowance has to be made for parallax. Finally a separate group comprises those instruments which reproduce at the battery the values determined by the appliance.

The above enumeration is not exhaustive, for the number of individual instruments or groups of instruments in various systems of measuring appliances is different, but this circumstance is immaterial to the subject of the present invention.

In these appliances the various instruments, or at least a large proportion of them, are very closely associated with one another, since the shooting elements to be ascertained represent individually the function of a plurality of variables. The individual instruments of the appliance must therefore be positively connected with one another, each according to the values to be ascertained thereby, or according to the influence thereof upon the final values. These connections are as a rule mechanical or electrical. On the other hand the individual instruments, in order to facilitate manipulation, and in order that they may take up as little room as possible, must be arranged partly side by side and partly one above another. Now the disadvantage of these appliances consists in the fact that the individual instruments are quite inaccessible or only accessible with great difficulty without taking the entire appliance to pieces, if one or other of the instruments is in need of repair. In such a case, therefore, it becomes necessary to dismount quite a number of satisfactorily working instruments in order to reach the instrument that is in need of repair; in fact in many cases the entire apparatus has to be taken to pieces for this purpose. Such exceedingly tedious work is however in the highest degree undesirable having regard to the purpose for which the apparatus is intended.

The present invention relates to an arrangement of the apparatus which renders it possible in case of need to make any instrument readily accessible, and to reduce the work of dismounting to a minimum. For this purpose, according to the invention, the instruments that ascertain the individual values are lodged individually or in groups in superposed casings or casing sections that are readily separable from one another, and the instruments or groups of instruments lodged in two different casings but co-operating with one another are connected with one another by readily releasable electrical or mechanical couplings.

These electrical or mechanical couplings between each two casings are so arranged that they become released upon separation of the two casings and become re-connected by re-assembling the casings.

One embodiment of the apparatus according to the invention is illustrated by way of example in the accompanying drawings, in which Figure 1 shows the appliance in side elevation;

Figures 2 and 3 each show one casing in plan;

Figure 5 shows the apparatus illustrated in

Figure 1:
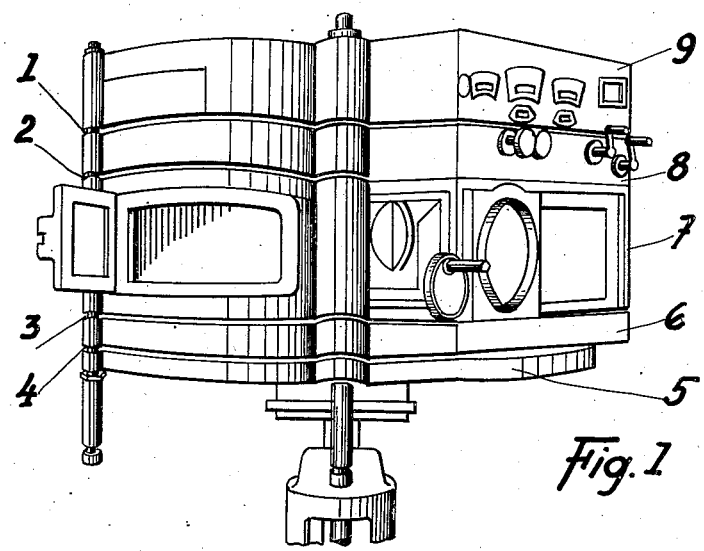

Figure 1 in sectional elevation on a larger scale, with the couplings between the instruments of two adjacent frames.

The apparatus assumed by way of example for ascertaining the shooting elements is divided according to the invention into five parts along horizontal planes at 1, 2, 3 and 4. The lowest part 5 is a base plate, and the parts 6, 7 and 8 are casings or casing sections for the accommodation of the various instruments or instrument units, these casing consisting individually of side walls 35, as shown in Figure 5. The casings 6, 7, and 8 thus form a frame, into which the instruments or groups of instruments are fitted by the aid of brackets 36. The uppermost casing 9 at the same time forms the cover.

Figures 2, 3:
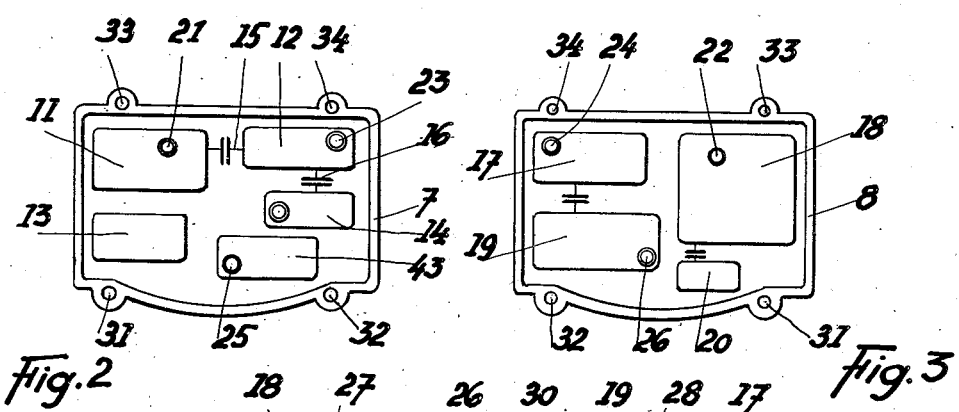
Figure 4:
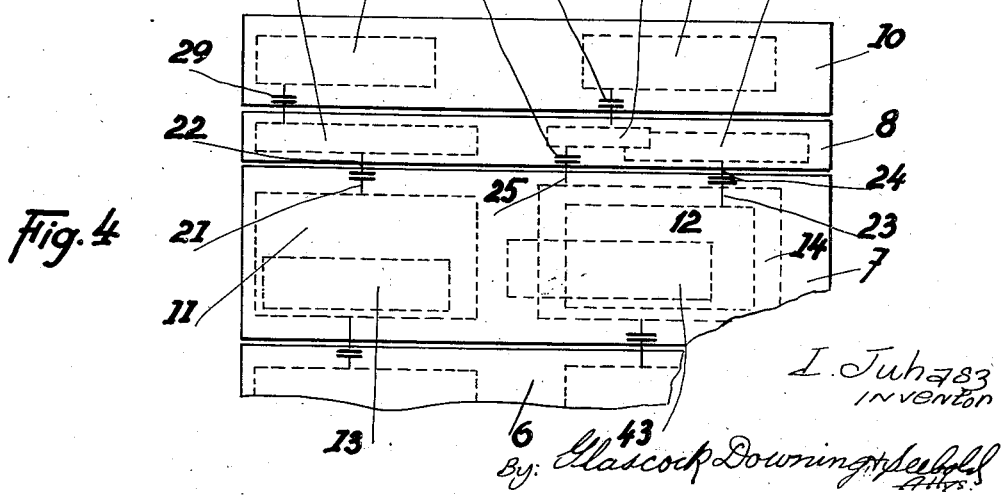
Figure 4 shows four superposed casing in side elevation.

Figure 2 shows the frame 7 in plan, and Figure 3 shows the frame 8 in plan. In the frame 7 are mounted various instruments 11, 12, 13 and 14, of which the instrument 11 is connected by a coupling 15 with the instrument 12, and the instrument 12 is connected by a coupling 16 with the instrument 14. In the frame 8 are likewise arranged four instruments 17, 18, 19 and 20. Of these the instrument 17 must co-operate with the instrument 12 in the frame 7, the instrument 18 must co-operate with the instrument 11 in the frame 7, and the instrument 19 must co-operate with the instrument 14 in the frame 7, in such a way that the instruments co-operating with one another are coupled to one another in pairs. For the coupling thereof, mechanical couplings known in themselves are employed, or electrical switches if the associated instruments are electrically operated. According to the invention couplings or switches are provided which close automatically when two frame-like casings are mounted one upon the other, and open automatically when the casings are separated from one another. As will be seen from Figure 4, the positive connection of the instrument 11 with the instrument 18 is established, when the casing 8 is mounted upon the casing 7, by a clutch member 21 coming into engagement with a clutch member 22. The instruments 12 and 17 are connected with one another by clutch members 23 and 24, and the instruments 14 and 19 by clutch members 25 and 26. It is not necessary that all the couplings between each two casings should be located in the same plane. As will be gathered from Figure 4, in which the instruments are shown in broken lines and the couplings in full lines, the couplings 21/22, 23/24 and 25/26 are located in different planes. The instrument 18 and the instrument 19 are coupled to the instruments 27 and 28 respectively, which are arranged in the uppermost casing 9, while the instrument 13 and the instrument 14 are coupled to instruments in the casing 6.

Figure 5 shows a partial section through the appliance on a larger scale, in which, however, the individual casings have been moved asunder for the sake of greater clearness. The instrument 18 in the casing 8 is connected with the instrument 11 in the casing 7 by a mechanical coupling, the upper member of which consists of a shaft 37 provided with a sleeve 38. The sleeve 38 is secured to the shaft 37 with a pin 39, and is provided with a slot 40, in which a tappet or driving element 41 on the shaft 42 of the instrument 11 engages when the coupling is closed. Similar mechanical couplings are provided between the instrument 13 in the casing 7 and the instrument 53 in the casing 6, and between the instrument 52 in the casing 9 and the instrument 43 in the casing 7.

The instrument 17 in the casing 8 and the instrument 12 in the casing 7 are connected with one another by means of an electric switch. This switch consists of a metallic sleeve or socket 45, fitted into the bottom 44 of the instrument 17, and an electrically conducting contact member 46 supported in the bore of the sleeve with a spring 47, which presses the contact member, in the open position shown, against a stop or abutment 48 on the sleeve 45. The bottom 44 of the instrument 17 is made of insulating material. In the cover 49 of the instrument 12, likewise of insulating material, there is a co-acting contact member, which forms the bottom of a bore 51 in the cover 49. When the casings 7 and 8 are assembled, the contact 46 slides into the bore 51 and bears against the contact 50.

In the example assumed, the casings are connected with one another by means of screws 31, 32, 33 and 34 passing through them. After these screws are released the individual casings can be separated from one another, after which each individual instrument is quite readily accessible. These screws pass through alined apertures in all the sections, with no more clearance than is necessary in order to enable them to be readily withdrawn and replaced, thus precluding the possibility of erroneous lateral positioning of the sections in assembling.

Instead of the mechanical couplings and switches described between the individual instruments, any other convenient couplings and switches may be employed.

In the embodiment described and illustrated the individual casings are superposed in such a way that the planes of division are horizontal. The invention may however be embodied in a form in which the appliance is taken to pieces by dividing the casing in vertical planes, which are arranged side by side. Finally the dividing surfaces need not be planes, but may even be stepped surfaces.

What I claim is:

1. Apparatus for determining the shooting data of moving targets, more particularly of flying targets, comprising a casing formed of a plurality of readily separable sections, a plurality of instrument units for determining the individual values of the various quantities upon which the shooting data depend, the instrument units being lodged in the casing upon the various sections thereof, and couplings carried by certain instrument units in different sections adapted to separate and unite automatically when the sections are separated and assembled, whereby values ascertained by instrument units lodged in different sections can be transmitted to instrument units lodged in other sections to formulate the data on the basis of which these other instrument units determine other values.

2. Apparatus for determining the shooting data of moving targets, more particularly of flying targets, comprising a casing formed of a plurality of readily separable sections, a plurality of instrument units for determining the individual values of the various quantities upon which the shooting data depend, the instrument units being lodged individually and in groups in the casing upon the various sections thereof, and electrical and mechanical couplings carried by certain instrument units in different sections adapted to separate and unite automatically when the sections are separated and assembled, whereby values ascertained by instrument units lodged in different sections can be transmitted to instrument units lodged in other sections to formulate the data on the basis of which these other instrument units determine other values.

3. Apparatus for determining the shooting data of moving targets, more particularly of flying targets, comprising a casing formed of a plurality of readily separable sections, mechanical means for ensuring the correct relative positions of the casing sections when assembled, a plurality of instrument units for determining the individual values of the various quantities upon which the shooting data depend, the instrument units being lodged in the casing upon the various sections thereof, and couplings carried by certain instrument units in different sections adapted to separate and unite automatically when the sections are separated and assembled, whereby values ascertained by instrument units lodged in different sections can be transmitted to instrument units lodged in other sections to formulate the data on the basis of which these other instrument units determine other values.

ISTVÁN JUHÁSZ.